United States Patent
Kanniappan et al.

(10) Patent No.: US 9,444,635 B2
(45) Date of Patent: Sep. 13, 2016

(54) BANDWIDTH ALLOCATION FOR MULTIMEDIA CONFERENCING

(75) Inventors: Senthil K. Kanniappan, San Jose, CA (US); Tiong-Hu Lian, Cupertino, CA (US); Steven G. Fry, Oakland, CA (US)

(73) Assignee: Cisco Technology, Inc., San Jose, CA (US)

(*) Notice: Subject to any disclaimer, the term of this patent is extended or adjusted under 35 U.S.C. 154(b) by 321 days.

(21) Appl. No.: 13/369,586

(22) Filed: Feb. 9, 2012

(65) Prior Publication Data
US 2013/0208663 A1 Aug. 15, 2013

(51) Int. Cl.
| | | |
|---|---|---|
| *H04L 12/16* | (2006.01) | |
| *H04L 12/18* | (2006.01) | |
| *H04L 29/08* | (2006.01) | |
| *H04L 29/06* | (2006.01) | |

(52) U.S. Cl.
CPC ....... *H04L 12/1818* (2013.01); *H04L 12/1822* (2013.01); *H04L 65/4038* (2013.01); *H04L 65/80* (2013.01); *H04L 67/306* (2013.01); *H04L 69/24* (2013.01)

(58) Field of Classification Search
CPC ....... H04L 12/00; H04L 41/00; H04L 47/00; H04L 65/00; H04M 3/00; H04N 7/00; H04W 72/00
USPC ................................. 370/259–271
See application file for complete search history.

(56) References Cited

U.S. PATENT DOCUMENTS

| | | | |
|---|---|---|---|
| 5,751,712 A * | 5/1998 | Farwell et al. | 370/431 |
| 6,396,816 B1 * | 5/2002 | Astle et al. | 370/264 |
| 6,735,633 B1 * | 5/2004 | Welch et al. | 709/233 |
| 7,627,629 B1 * | 12/2009 | Wu | H04L 12/1818 348/14.09 |
| 7,788,383 B2 | 8/2010 | Andreasen | |
| 7,817,180 B2 | 10/2010 | Jeong et al. | |
| 8,036,214 B2 | 10/2011 | Elliott et al. | |
| 2002/0064136 A1 * | 5/2002 | O'Neil | 370/267 |
| 2007/0078986 A1 | 4/2007 | Ethier et al. | |
| 2007/0211141 A1 * | 9/2007 | Christiansen | 348/14.08 |
| 2010/0302345 A1 | 12/2010 | Baldino et al. | |
| 2011/0182303 A1 | 7/2011 | Le Faucheur et al. | |

OTHER PUBLICATIONS

Amir, et al., "Receiver-driven Bandwidth Adaption for Light-weight Sessions", ACM Multimedia, Nov. 1997, pp. 1-12.
Author Unknown, "ITU-T T.120 Telecommunication Standardization Sector of ITU, Series T: Terminals for Telematic Services Data Protocols for multimedia Conferencing" International Telecommunication Union, Jan. 2007, 46 pages.

* cited by examiner

*Primary Examiner* — Ricky Ngo
*Assistant Examiner* — Wei-Po Kao
(74) *Attorney, Agent, or Firm* — Merchant & Gould P.C.

(57) ABSTRACT

A method can include analyzing endpoint preference data from each of a plurality of endpoints of a multimedia conference. The endpoint preference data for each respective endpoint represents a desired distribution of bandwidth for different types of data in the multimedia conference for each respective endpoint. The method can also include allocating bandwidth between the different types of data for each of the plurality of endpoints in the multimedia conference based on the analysis of the endpoint preference data.

31 Claims, 4 Drawing Sheets

BANDWIDTH ALLOCATION FOR MULTIMEDIA CONFERENCING

TECHNICAL FIELD

This disclosure relates to allocating bandwidth for multimedia conferencing.

BACKGROUND

Videoconferencing uses audio and video telecommunications to bring together people at different sites. Videoconferencing can include a conversation between two endpoints (point-to-point) or it can involve several endpoints (multipoint). Besides the audio and visual transmission of meeting activities, some videoconferencing technologies can share documents and present various other types of information, such as via whiteboards and other presentation formats.

DESCRIPTION OF EXAMPLE EMBODIMENTS

Overview

This disclosure relates to allocating bandwidth for a multimedia conference. The multimedia conference involves a multi-party communications session in which two or more types of data (e.g., streams of audio, video, presentation data and the like) can be communicated between respective endpoints. In one example embodiment, preference data can represent a distribution of bandwidth for different types of data communicated in the multimedia conference for with each endpoint. For instance, the preference data for a given endpoint can be provided in response to a user input at the given endpoint. The preference data for the endpoints can be analyzed, collectively, to determine a corresponding distribution of bandwidth for the different types of data in the multimedia conference. The bandwidth between the different types of data in the multimedia conference can be allocated based on the analysis of the endpoint preference data. In some embodiments, the preference data from different endpoints can be weighted differently as part of the analysis. By enabling users to influence the allocation of bandwidth for the multimedia conference in this manner, the overall user experience can be improved.

EXAMPLE EMBODIMENTS

Figure 1:
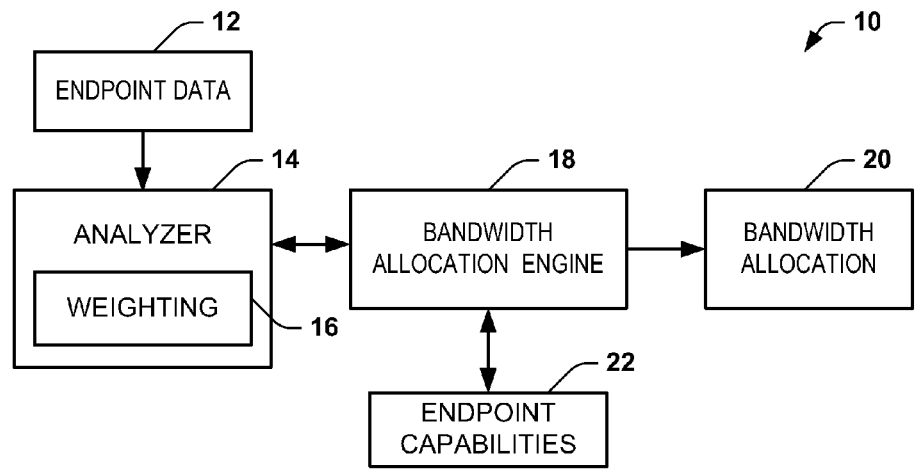
FIG. 1 illustrates an example a bandwidth allocation system.

FIG. 1 depicts an example of a system 10 that can be utilized for generating bandwidth allocation instructions for use in a multimedia conference. As used herein, the term "multimedia conference" refers to a multi-point communication between any number of two or more endpoints that can communicate more than one type of data. Each type of data can be communicated as a separate data stream, such as according to a selected communication protocol for such data type. Examples of different types of data that can be communicated in a multimedia conference include audio only, audio and video communication, video, text, still images, and other presentation data. The presentation data can further include still image viewing, annotation, shared whiteboard, facsimile as well as other functions, such as can include remote computer application piloting and screen sharing and other interactive collaboration applications accessible by one or more users at a given endpoint. The multimedia conference thus can enable multi-point communications of voice, video and data.

As used herein, the term "multi-point communication" refers to an interconnection of multiple endpoints (e.g., terminals). For example, a point-to-point connection corresponds to a simple form of a multi-point connection.

The system 10 employs endpoint data 12 such as can be received in response to a user input at a corresponding endpoint. For each endpoint in a multimedia conference, the endpoint data 12 can represent user preferences for a desired distribution of bandwidth for different types of data in the multimedia conference for each respective endpoint. For example, endpoint data 12 can be received for a given endpoint in response to a user input at a corresponding endpoint terminal via a graphical user interface (GUI). The endpoint data 12 can be used to set preference when a conference is initiated. Additionally or alternatively, the endpoint data 12 can be set during a conference, such as can be used to dynamically change the distribution of bandwidth for different types of data in the multimedia conference.

An analyzer 14 is programmed to analyze the endpoint data 12 to determine a distribution of bandwidth for the different types of media for the corresponding multimedia conference. The analyzer 14 can also employ a weighting function 16 that can assign a weighting to the endpoint preferences provided in the endpoint data 12 based on the ranking for preferences provided by each respective endpoint. The weighting function 16 can apply the respective weighting to the endpoint bandwidth distribution preferences so that the corresponding allocation of bandwidth between the different types of media can account for the ranking and weighting that is applied.

By way of example, each endpoint in a multimedia conference can be assigned a rank relative to each other endpoint. The ranking can be used (e.g., by the analyzer 14) to apply a relative weighting to the preferences received from each endpoint, such that bandwidth preferences of higher ranking endpoints can be afforded a great weight than lower ranking endpoints. In one example, the rank for a given endpoint that provides corresponding endpoint data 12 can be based on an identity of a user or participant at each respective endpoint. For example, the ranking can be based on a hierarchical structure of an organization, such as a business, enterprise or other organization in which the participants may belong. Alternatively or additionally, a ranking can be based on each participant's status in the multimedia conference. For example, a convener of the multimedia conference can have a higher rank than invited participants to the conference.

As another example, the ranking of endpoints and corresponding weighting applied to preferences from each endpoint can be based on a known location of the endpoint (e.g., a resource location, such as uniform resource locator (URL) or IP address). The analyzer 14 can use the location information for each endpoint as an index to a look-up table or to query a database to determine a predetermined weighting that is to be applied to preference data for each respective endpoint.

The system 10 also includes a bandwidth allocation engine 18. The bandwidth allocation engine 18 is programmed to provide a bandwidth allocation 20 for managing the distribution of the bandwidth that has been allocated to each of the respective endpoints based on the analysis implemented by the analyzer 14. The bandwidth allocation engine 18 can also determine the bandwidth allocation 20 for many different types of media based on endpoint capabilities 22 for each of the endings in the multimedia conference. The endpoint capabilities 22 can be ascertained during call setup, such during a capabilities negotiation. The endpoint capabilities 22 for each endpoint can specify its media capabilities such as by identifying a set of one or more codecs. The capabilities 22 can also provide information about maximum number of audio frames, samples per packet, information about silence suppression and other terminal capabilities.

By way of further example, the analyzer 14 can determine the bandwidth allocation for each type of data in the multimedia conference as a percentage that can be applied the total available allocated bandwidth for each endpoint in the multimedia conference. As mentioned above, the total available bandwidth that is allocated for a given endpoint can be established as part of a call set-up and control signaling phase for the multimedia conference and thus be specified as part of the endpoint capabilities 22. The total available bandwidth allocated for each endpoint in the multimedia conference may be the same or different bandwidths can be allocated, such depending on the endpoint capabilities and the type of multimedia conferencing system. Regardless of the type of system, an initial bandwidth allocation for each endpoint can be established via negotiations during call set-up and connection, such as according to known or yet to be developed call control protocols.

As an example, the multimedia conferencing system employs a switched model in which a control unit (e.g., a switch or bridge device) simulcasts the multimedia conference to each of the endpoints. In the switched model topology, where the total bandwidth allocated to each of the endpoints is the same, the bandwidth allocation engine 18 can set the bandwidth allocation for each of the different types of data to be the same for each of the endpoints based on the analyzer 14.

As a further example, where different endpoints have different bandwidth capabilities and the conferencing system is capable of accommodating different endpoint capabilities in a given multimedia conference, the bandwidth allocation engine 18 can set the bandwidth allocation 20 to provide different bandwidth distributions for each of the different types of data for endpoints in the multimedia conference. This situation may exist where the multimedia conferencing system is implemented as a transcoded model, such as by employing a control unit that includes a plurality of digital signal processors programmed to transcode multimedia data streams communicated to each of the endpoints. For example, the control unit can encode and re-encode data using codecs to accommodate the individual capabilities for each respective endpoint. In this example, the bandwidth allocation 20 can provide for substantially the same percentages of bandwidth being allocated for the different types of media for each of the endpoints. However, due to the different total bandwidth allocation for the endpoints, the actual bandwidth distribution for the different media types would be different for each endpoint depending upon its total bandwidth. That is, the bandwidth allocation engine 18 can apply the same percentage of bandwidth distribution for each of the different types of media (e.g., as determined by the analyzer 14) to provide substantially the same proportional bandwidth distribution for each respective endpoint in the multimedia conference, while still permitting the actual bandwidth distribution to vary according to endpoint capabilities.

As an example, if the analyzer 14 determines that seventy-five percent of the total available bandwidth be allocated to audio and video data and twenty-five percent of the bandwidth be allocated to presentation data, the bandwidth allocation engine 18 can apply such percentages to set the distribution of audio and video data as well as presentation data for the multipoint communication proportionally for with each endpoint. As noted above, the resulting bandwidth distribution and allocation can vary depending upon the codecs that are available, such as defined by the endpoint capabilities 22.

Additionally, since different codecs may require different amounts of bandwidth, the bandwidth allocation engine 18 may not be able to exactly match the percentages of bandwidth distribution for a given type of media determined by the analyzer 14. For instance, the bandwidth allocation engine 18 can further be programmed to select from a subset of available codecs, as provided in the endpoint capabilities 22, according to the distribution of bandwidth that affords the highest resolution and best matches the distribution of bandwidth determined by the analyzer 14. Since there is a maximum total available bandwidth for each given endpoint, the resulting actual total bandwidth for the given endpoint (e.g., the sum of bandwidths for each codec that is utilized) set by the bandwidth allocation engine 18 may be less than the total available bandwidth. Moreover, the actual bandwidth used for communication with a given endpoint can vary depending upon the distribution of bandwidth among the different types of media and encoding schema.

By allocating bandwidth in this manner, the overall user experience can be improved. For example, as a given type of communication or data becomes of greater interest over others, users can change their respective preferences (e.g., voting via GUIs) and dynamically change the bandwidth distribution in substantially real time so that a greater bandwidth may be allocated to enhance the resolution or quality of media being presented at each respective endpoint.

Figure 2:
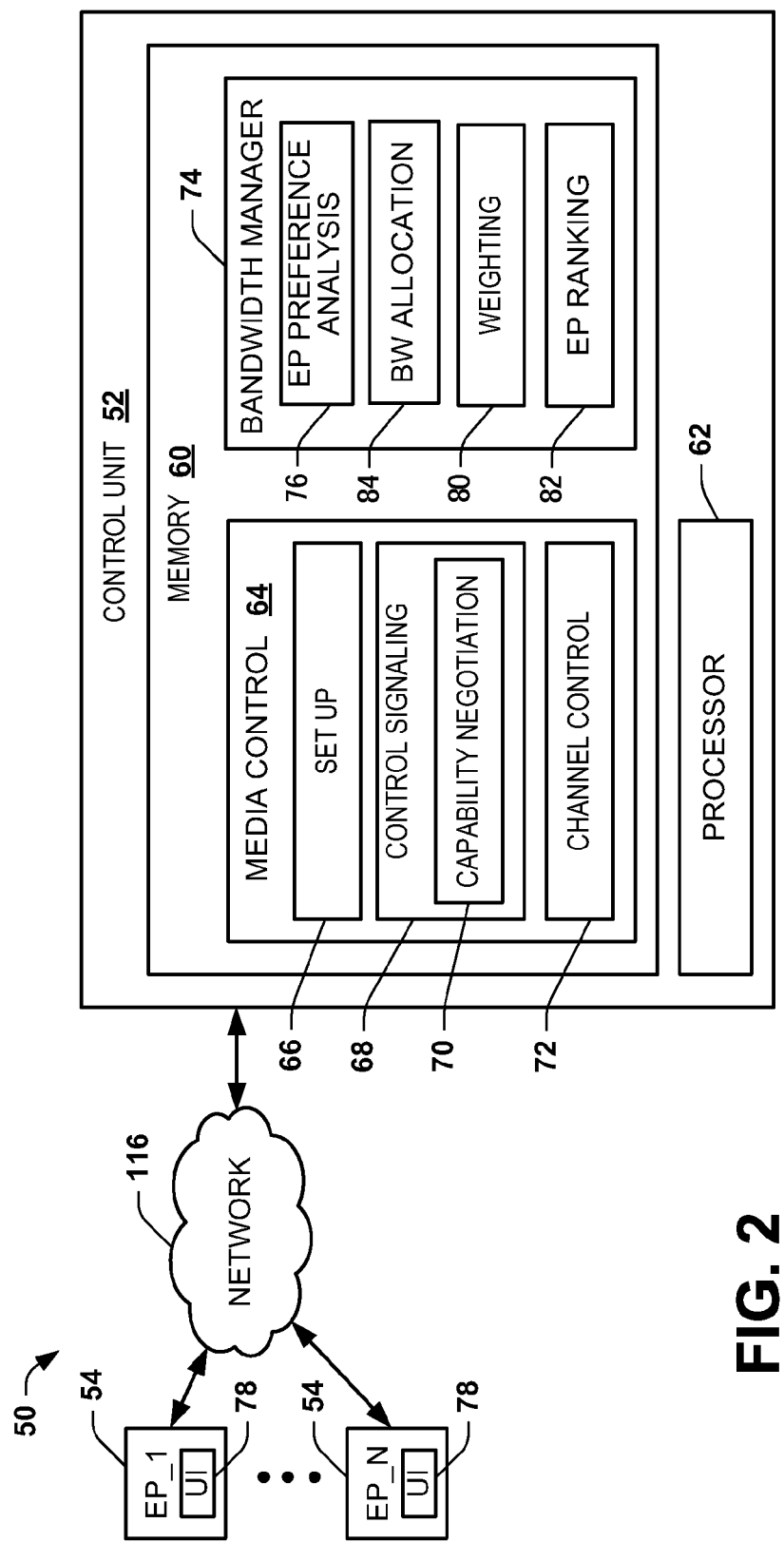
FIG. 2 illustrates depicts an example of a multimedia conferencing system demonstrating an example of a control unit.

FIG. 2 depicts an example of a multimedia conference system 50. The system 50 includes a control unit 52 that is in multi-point communications with a plurality of endpoints 54, demonstrated at EP_1 through EP_N, where N is a positive integer greater than 2 denoting the number of endpoints in the system. It is to be understood that the control unit 52 itself can operate as an endpoint in the system 50. Each of the endpoints 54 and the control unit 52 can be in communication with each other via a network 56. The network 56 provides a communication interface between the endpoints 54 and the control unit 52. The network 56 can include any of a local area network, a wireless local area network, a wide area network (e.g., the internet), a metropolitan area network (MAN) or any other appropriate system architecture that facilitates communication in a network environment. As an example, the network 56 can employ a TCP/IP communication language protocol.

The control unit 52 can include memory 60 that stores data and instructions for use in controlling one or multimedia conferences. The memory 60 may be any form of volatile or non-volatile memory including magnetic media, optical media, random access memory (RAM), read-only memory (ROM), erasable programmable ROM, electrical erasable programmable ROM, removable memory, flash memory or any other type of local or remote memory component that may be implemented in the system 50.

The control unit 52 also includes a processor 62 that can execute instructions stored in the memory 60. The processor 62 may be a microprocessor, controller, application specific integrated circuit, field programmable gate array or any other suitable computing device, resource or combination of hardware with encoded software embedded logic operable to provide the functionality disclosed herein.

The control unit 52 can operate as a conference server that receives media streams from the endpoints 54, mixes the streams, and sends individual streams back to the endpoints. The functionality provided by the control unit 52 can be implemented as software or a combination of hardware and software. The control unit can be a stand-alone hardware device, or it can be embedded into another multimedia or videoconferencing unit. Each of the control unit 52 and the endpoints 54 the can be configured to operate according to one or more existing or yet to be known protocols. As one example, the control unit 52 and endpoints 54 can operate according to H.323 and its related protocols for controlling multimedia communications via the network 56. Other protocols, such as Session Initiation Protocol (SIP)/Binary Floor Control Protocol (BFCP), can also be utilized. While a single control unit is demonstrated in the example of FIG. 2, the system 50 can include any number of one or more control units.

In the example of FIG. 2, the memory 60 includes a media control function 64 that is programmed to control multi-point communications in the system 50. The media control 64, for example can be implemented according to the H.323 protocol. Additionally or alternatively, the media control 64 can employ H.245 call control. The media control 64 can include call setup phase 66 to establish a multi-point connection between two or more endpoints 54, such as in response to a request from an endpoint. The setup phase 66 thus can set the initial call parameters and establish a connection for a multimedia conference between two or more endpoints.

The media control 64 can also include control signaling 68 to enable multi-point communications in the system 50. The control signaling 68 can include capability negotiation 70 as well as opening and closing of logical channels for audio and video flows, flow control and conference control for multi-point communications. The capability negotiation 70 enables endpoints to communicate without prior knowledge of the capabilities of each other. The control signaling 68 further can enable rich multimedia capabilities for the multi-point communication of various types of media including audio, video, text and data communication as well as the bandwidth allocated to each type. The control signaling 68, for example, may be implemented according to ITU H.245, which further can be used to enable real-time data conferencing capability through related protocols, such as ITU T.120. The T.120 series of standard provides for enhanced data conferencing capabilities within the context of the multimedia conference. Examples of some data conferencing capabilities include application sharing (e.g., via T.128), electronic whiteboard (e.g., via T.126), file transfer (e.g., via T.127), and text chat (e.g., via T.134).

As a further example, the capability negotiation 70 can involve selecting one or more codecs for each multi-point communication with a given endpoint 54. Some examples of some coding standards that can be implemented at the endpoints 54 to provide for different types of media communication are forth in the following table.

| Media type | Standard |
| --- | --- |
| Video | H.261, H.263, H.264 |
| Audio | G.711, G.729, G.729a, G.723.1, G.726 |
| Text | T.140 |
| Data | T.120 |

Once the capabilities of the respective endpoints 54 have been successfully negotiated, the media control 64 can employ a channel control 72 to establish the channels according to the negotiated capabilities and bandwidth allocation. For example, media flows for the multimedia conference can be opened by sending an open channel message and receiving an acknowledgement message. Upon receipt of the acknowledgement message from a remote endpoint, the endpoints can communicate media.

The control unit 52 also includes a bandwidth manager 74 programmed to control bandwidth for multi-point communication with each of the endpoints 54. The bandwidth manager 74 can operate during initial set-up, such as part of the control signaling 68 for establishing multi-point communications. Additionally or alternatively, the bandwidth manager 74 can operate to modify the bandwidth allocation as well as the distribution of bandwidth for different types of media for communication with one or more of the endpoints 54. Thus, as disclosed herein, the bandwidth distribution can dynamically change during a multimedia conference in response to user preferences.

The bandwidth manager 74 can include endpoint preference analysis 76 that is programmed to analyze endpoint preference data, such as can be provided by each of the respective endpoints 54. The endpoints preference data can be received at the control unit 52 in response to user inputs provided via a user interface 78 at each of the respective endpoints 54. For example, the user interface 78 can be in the form of graphical objects (e.g., a slide, dial, dialog box or the like) to selectively enter user preferences for a distribution of bandwidth among two or more different types of media in a multimedia conference. Endpoint preferences can be set to include default values that can be utilized by the bandwidth manager 74 if a user does not indicate any particular preferences for the bandwidth distribution for the multimedia conference. The endpoint preference analysis 76 thus can determine a corresponding bandwidth allocation for the multimedia conference based on preference data received from one or more of the respective endpoints 54.

The bandwidth manager 74 further may include a weighting function 80 that can apply weighting to each of the endpoint preferences, such as according to a defined relative importance of the endpoint preferences. For example, a greater weight can be afforded to endpoint preference data from one endpoint relative to the preference data received from another endpoint determined to be of a lesser relative importance. Such weighting can be based on an endpoint ranking 82. The endpoint ranking 82 can be fixed or variable during a given multimedia conference. In one example, the ranking 82 can be set for each endpoint based on an identity of a user at a given endpoint. Alternatively or additionally, the ranking can be based on the status of each endpoint in a given multimedia conference (e.g., a convener may be determined to have a greater relative importance to a participant). Moreover, the endpoint ranking 82 can be implemented to rank endpoints according to a combination of two or more different criteria (e.g., organizational hierarchy, status for conference, location and the like), which that may be applied collectively by the weighting function 80 in weighting the bandwidth allocation preferences. The endpoint analysis can provide an output value that specifies a distribution of bandwidth for each of the different types of data communicated in a multimedia conference, such as can be a percentage value.

A bandwidth allocation function 84 thus can determine an actual bandwidth allocation for each endpoint 54 based on the preference analysis 76, weighting function 82 and capabilities of each respective endpoint in the multimedia conference. The bandwidth allocation function 84 can determine the available bandwidth for each endpoint based on capabilities that have been negotiated via the capability negotiation 70 and/or based on bandwidth requests received from each endpoint 54. The bandwidth allocation function 84 can apply the specified distribution of bandwidth to the total available bandwidth for each endpoint 54 to select codecs and protocols to enable communication of the different types of media data commensurate with the resulting bandwidth distribution preferences.

As an example, the bandwidth allocation function 84 can apply the bandwidth distributions specified by the preference analysis 76 (e.g., percentage values) proportionally to the actual available bandwidth capabilities of each respective endpoint 54. By applying the bandwidth preferences proportionally to each of the endpoints 54, the system 50 can accommodate differences in actual bandwidth capabilities among the endpoints, yet still afford improved user experience by emphasizing certain types of data according to the endpoint preferences.

Additionally, the endpoint preferences can change during the multimedia conference and result in dynamically adjusting bandwidth allocations accordingly. For example, in response to a change in bandwidth distribution preferences at a given endpoint 54 (e.g., via a user interface 78), the bandwidth manager 74 can initiate a reallocation of bandwidth for the multimedia conference. The reallocation can be applied to one or more (e.g., all) of the endpoints 54. For instance, the bandwidth manager 74 can provide updated bandwidth allocation instructions to the media control 64 for implementing changes, in substantially real-time, to the distribution of bandwidth for each endpoint's communication during the multimedia conference. The changes in distribution of bandwidth may result in changing resolution within a given codec or, alternatively, a different codec may be implemented for a given media stream. In this way, the changes in user preferences (e.g., made via the user interface 78) can be applied in substantially real-time to adjust user experiences consistently for each of the respective endpoints 54 based on the endpoint preference analysis 76, such as disclosed herein.

Additionally, in certain circumstances an endpoint may be programmed to request changes to the total bandwidth during a multimedia conference such as if the quality of service degrades below a threshold. The bandwidth request can be communicated to the control unit 52. The media control 64 can employ the bandwidth manager 74 to fulfill the request and adjust the total actual bandwidth for such endpoint (e.g., including changing codecs based on the modified capabilities of such endpoint) as well as the distribution of bandwidth for the media streams therein. For example, when the total bandwidth for a given endpoint is increased, the bandwidth allocation function 84 can change the bandwidth distribution proportionally during the multimedia conference. Similarly, if the bandwidth request is to decrease the total bandwidth for a given endpoint, the bandwidth allocation function 84 can adjust the distribution of bandwidth for the different types of media proportionately, such as to maintain the substantially same percentages of bandwidth distribution for the reduced bandwidth. Such changes can involve changing one or more codecs and/or changing other communication parameters to substantially accommodate bandwidth changes for the multimedia conference.

As disclosed herein, the resulting actual bandwidth distribution for a given endpoint further may vary somewhat from the bandwidth distribution determined by the endpoint preference analysis 76. Such differences can be based on the capabilities of each respective endpoint (e.g., the codecs and bandwidth required to implement such codecs) as well as any minimum thresholds that may be set for the bandwidth of a given type of media. For example, a minimum bandwidth threshold can be set and utilized by the bandwidth manager for a video such as to maintain at least a certain quality of video service for one or more of the endpoints 54. The actual bandwidth allocation for each endpoint can nonetheless be said to substantially match the allocation of bandwidth determined by the endpoint preference analysis 76, as the term "substantially" is used herein to allow for such variations (e.g., ranging from about 1% to about 10% for each type of media).

Figure 3:
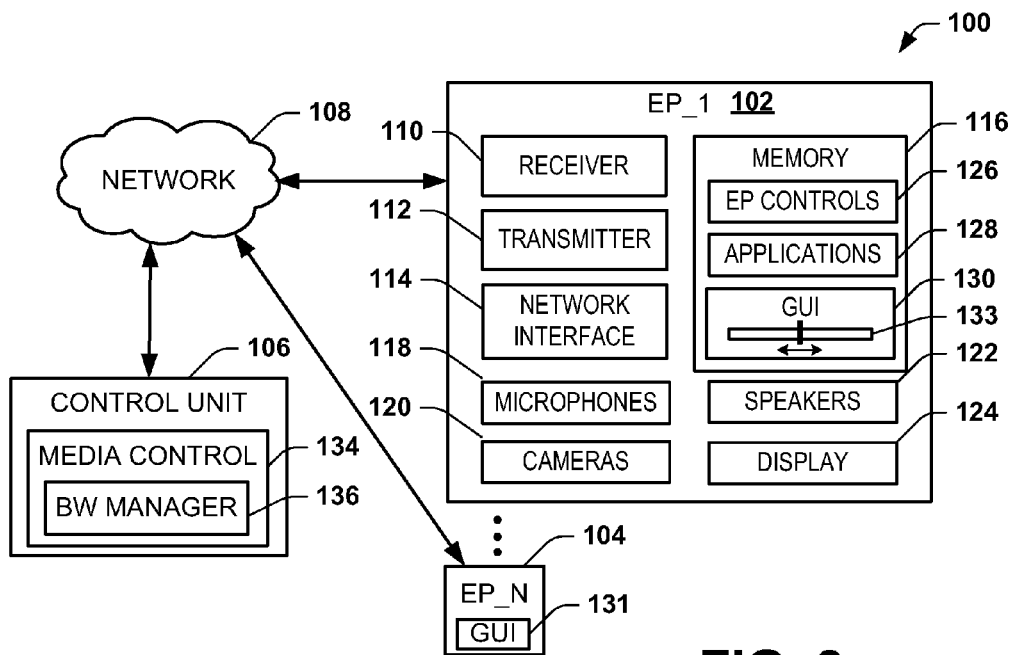
FIG. 3 depicts a multimedia conferencing system demonstrating an example of an endpoint.

FIG. 3 depicts an example of a multimedia conferencing system 100 demonstrating an example of an endpoint 102 that can be implemented. The system 100 can include two or more endpoints 102 and 104, indicated at EP_1 through EP_N where N is an integer denoting the number of endpoints. The system 100 also includes a control unit 106, which in some examples may be considered an endpoint within a multimedia conferencing system 100. Each of the endpoints 102 and 104 and the control unit 106 may communicate via a network 108 such as disclosed herein.

In the example of FIG. 3, the endpoint 102 includes a variety of components for performing multimedia conferencing functions. For example, the endpoint EP_1 can include a receiver 110, a transmitter 112, a network interface 114 and memory 116. The endpoint 102 can also include one or more microphones 118, one or more cameras 120, one or more speakers 122 and one or more displays 124. The memory 116 can include instructions and data for enabling operation of the endpoint within the multimedia conferencing system 100. The receiver 110 can be utilized in conjunction with the network interface for receiving multimedia conferencing signals, such as can be provided from the control unit and one or more of the other endpoints. The transmitter 112 further can be utilized in conjunction with the network interface 114 for sending signals such as can be received via the microphones 118, cameras 120. The speakers 122 and display 124 can be utilized to provide information that is received via the receiver as part of the multimedia conference.

The memory 116 can be programmed with endpoint controls 126 utilized to control endpoint functionality including interactivity with one or more users. The endpoint controls 126 can be configured according to existing or yet to be developed protocols for multimedia multipoint communications. For example, the endpoint controls can be configured to implement the H.323 standard from the Telecommunication Standardization Sector (ITU-T) of the International Telecommunication Union (ITU) and related multimedia communication protocols (e.g., H.225, T.120, H.245, SIP/BFCP and the like). One or more applications 128 further can be stored in the memory and executed (e.g., by a processor) at the endpoint 102 such as corresponding collaboration applications and the like that can be used by the endpoint for presenting information and data in the multimedia conference. The applications 128 can reside locally in the endpoint or be remotely stored and accessible via corresponding application interfaces, such as may be distributed across the network 108. As a further example, the endpoint controls 126 can be configured to employ the T.120 series of protocols to support application sharing, real-time text conferencing and related functionality in which data and other collaborative information at a given one of the endpoints 102 can be shared with the other endpoints 104, such as can be implemented via the applications 128.

The endpoint 102 can also include a GUI 130 that can be utilized for setting and configuring parameters for the multimedia conference and otherwise interacting with the applications 128. For example, a user can employ the GUI 130 to establish preferences for distribution of different types of multimedia data for a given multimedia conference. The type and form of GUI can vary according to application requirements and how the endpoint is configured. As one example, the GUI can be implemented to include an adjustable slide 133 user interface element that can be moved along a scale in response to an input received via a user input device (e.g., a mouse, touch screen, keyboard, gesture control, or the like) for selecting a desired distribution of bandwidth among different types of data, such as audio/video data and presentation data. The controller can adjust the bandwidth allocation to the most commonly requested allocation, such as after a predetermined minimum number of requests have been received.

Alternatively or additionally, the GUI 130 can afford a finer level of granularity, such as to allow a user to select a distribution of available bandwidth different data streams within a given type of media that is being shared in a multimedia conference. For instance, the GUI 130 can allow a user to select individual applications and presentations (e.g., running on the computer) that are to be shared, and to set user preferences for how much of the available bandwidth is desired for each of such applications and presentations.

Each endpoint 102 and 104 can include a GUI 130 and 131 for user interaction, including for selecting a desired distribution of bandwidth for different types of data in the multimedia conferencing. The setting can be applied at the beginning of a multimedia conference, such as during capability negotiations. Alternatively or additionally, a user may employ the GUI 130 at a given endpoint during the conference to dynamically change the bandwidth distribution for different types of media.

As disclosed herein, GUI 130 and 131 can be employed to set user preferences, which can be submitted from each endpoint 102 and 104 as preference data to the control unit 106. The control unit can analyze the preferences and determine a corresponding allocation of bandwidth for each type of media for each respective endpoint 102-104 in the multimedia conference. The control unit 106 can include a media control 134 that can be utilized to control operating parameters for each video conferencing session. The media control 134 can be implemented similar to as disclosed with respect to the control unit 52 of FIG. 2. Briefly stated, the media control 134 can include a bandwidth manager 136 that is programmed for allocating bandwidth and defining a distribution of bandwidth allocation for different types of data that are communicated during a video conference. In this way, the overall user experience for a multimedia conference at each endpoint 102-104 can be enhanced by allowing users to define preferences for bandwidth allocation for different types of media that is being communicated. Additionally, the preferences received from each of the endpoints can be weighted to each other so that more important preferences (e.g., depending on roles of users or locations of respective endpoints) can be given priority over less important preferences in establishing the resulting distribution of bandwidth.

Figure 4:
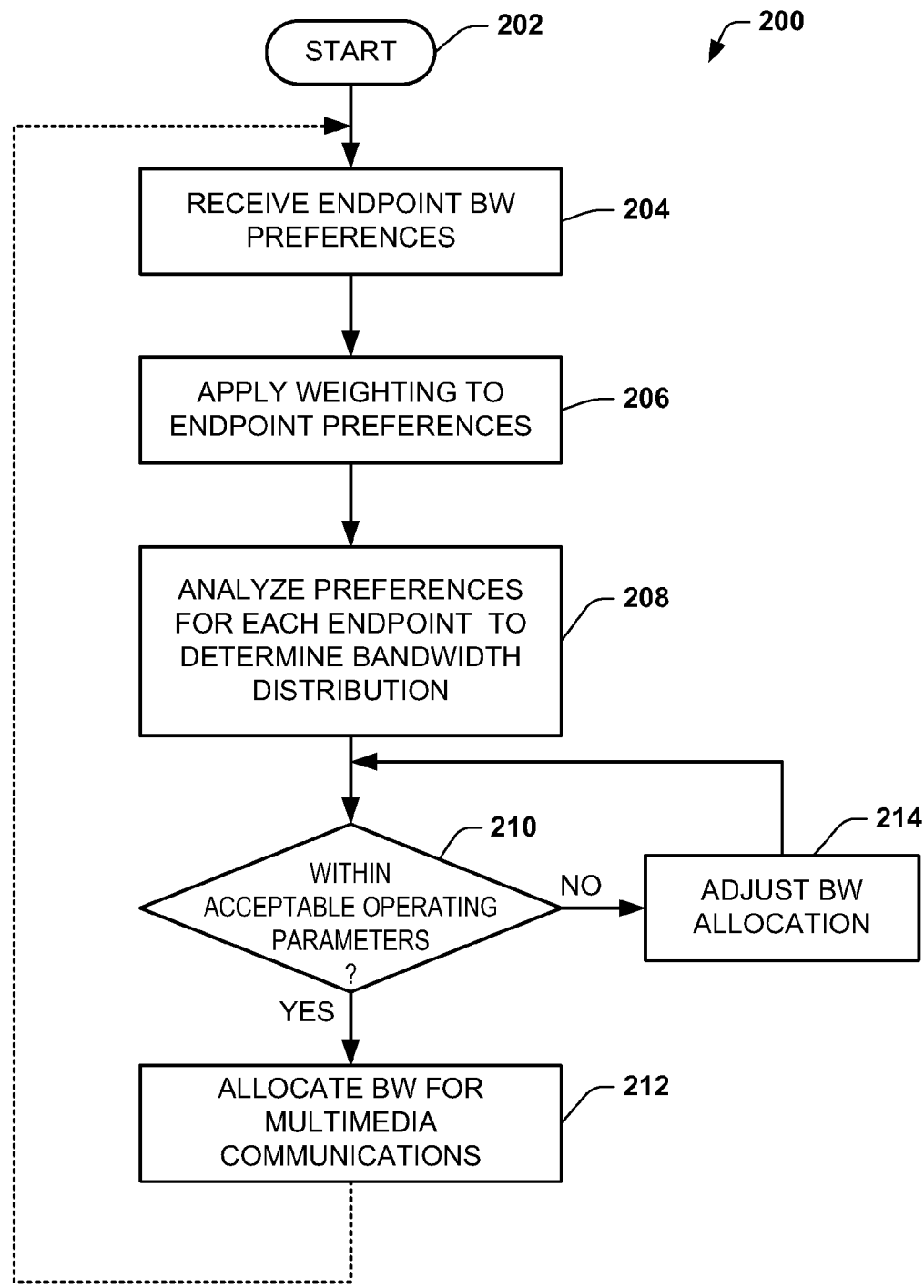
FIG. 4 is a flow diagram depicting an example of a method for allocating bandwidth.
Figure 5:
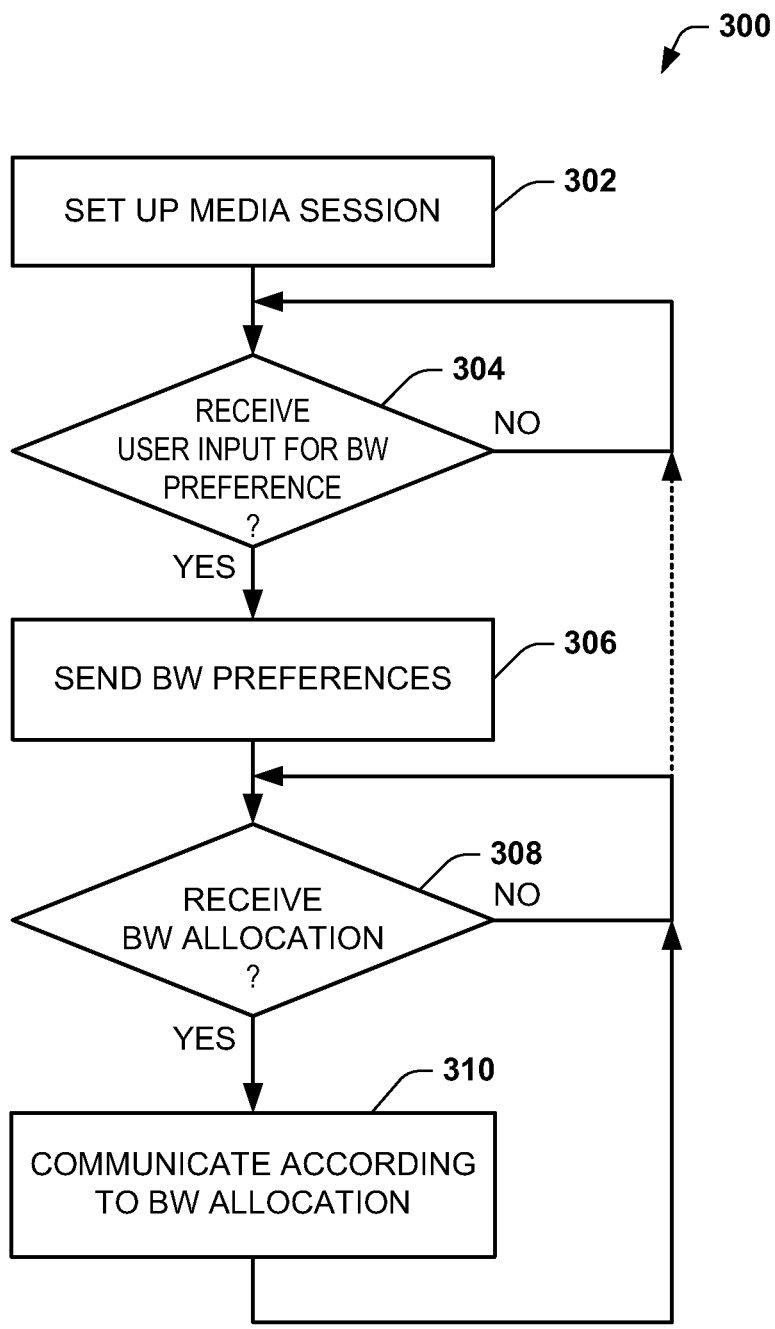
FIG. 5 is a flow diagram depicting an example of a method for setting bandwidth allocation preferences.

In view of the foregoing structural and functional features described above, example methods will be better appreciated with reference to FIGS. 4 and 5. While, for purposes of simplicity of explanation, each method is shown and described as executing serially, it is to be understood and appreciated that such methods are not limited by the illustrated order, as parts of the method could occur in different orders and/or concurrently from that shown and described herein. Each such method can be implemented as instructions stored in memory or executed by a processor of a computer or related video conferencing device, for example.

FIG. 4 depicts an example of a method 200 for allocating bandwidth for multipoint communications, such as in a multimedia conference. The method can be implemented in the context of the structure and function disclosed in relation to FIGS. 1-3, namely to provide an integrated voice, video, and data network for multipoint communications between endpoints. The method begins at 202 in which a multimedia conference can be set-up and capabilities of respective endpoints negotiated to determine a total of available bandwidth allocation for each endpoint. As disclosed herein, the total bandwidth allocation for the endpoints can be the same or different according to the individual capabilities of the endpoints and other system capabilities.

At 204, endpoint bandwidth preferences can be received. Preferences can be received in response to user inputs provided via respective GUIs for one or more endpoints. Bandwidth preferences may be received from any number of endpoints, ranging from no endpoints (if no user input is provided) up to all endpoints (if each user makes a preference) during a given multimedia conference. If no user input received for a given endpoint, predetermined default bandwidth preferences can be utilized. The identity of the user or location may also be included with the information or the information can be obtained a priori to the video conference, such as in a given media request. Alternatively, such user or location identity information may be determined from information contained in a request from a given endpoint. For instance, if no user bandwidth preference is received for a given endpoint, the identify information can be used to retrieve default parameters (e.g., stored as part of a user profile). Alternatively, the default bandwidth parameters may be the same for all users. At 206, weighting can be applied to the endpoint preferences received at 204. The weighting can be applied to the preferences as disclosed with respect to the weighting function 80 (FIG. 2).

At 208, the endpoint preferences can be analyzed, including the weighting applied at 206, to determine a bandwidth distribution for different types of media for the respective endpoints. For example, the bandwidth distribution can be proportionately the same for each endpoint, such as different percentages of the total available bandwidth being allocated in the same relative proportion for each of the different types of data that may be communicated during the multimedia conference. As another example, the bandwidth distribution determined at 208 may include different proportional allocations for different endpoints, such as may vary depending upon the weighting applied to 206. For example, if a CEO or other higher ranking user is determined to have a greater importance for a given multimedia conference, such user may not have their bandwidth allocation affected in response to changes in by lower ranking endpoints in a given multimedia conference. As an alternatively, the bandwidth distribution for communications with each of the endpoints may vary disproportionately according to the weighting at 208. As yet another alternative, to provide a common user experience to all endpoints, the bandwidth distribution determined at 208 for data communicated with each of the endpoints can be applied equally proportionally to each of the endpoints based on the analysis of the preference data.

At 210, a determination is made as to whether the bandwidth distribution (e.g., computed at 208) is within accessible operating parameters. For example, the determination at 210 can be based on the capabilities of each of the endpoints (endpoints 54 of FIG. 2) and/or the capabilities of conference bridge (e.g., the control unit 52 of FIG. 2). If the determined distribution of bandwidth is acceptable, the method can proceed to 212 in which the available bandwidth for the multimedia conference for each endpoint can be reallocated (e.g., by the bandwidth allocation function 84 of FIG. 2). The actual bandwidth allocation at 212 for each endpoint is based on the determined bandwidth distribution for the respective streams at 210; however, the capabilities and codecs that are available for a given endpoint can be selected and configured to substantially match the actual allocation with the distribution determined at 210 for each of the endpoints. The resulting actual distribution of bandwidth of different types of data for each respective endpoint can vary from endpoint to endpoint depending upon their capabilities and system configuration. From 212 the method can return to 204 (e.g., via the dotted line) in which the bandwidth allocation can dynamically vary in response to changes in endpoint bandwidth preferences being received at 204 (e.g., via the user interface 78 of FIG. 2 or GUI 130 or FIG. 3).

If, at 210, the negotiated bandwidth distribution is determined not to be within the acceptable operating parameters, the method can proceed from 210 to 214 and the bandwidth allocation can be adjusted. The adjustment to the bandwidth allocation, for example, can be utilized to ensure that the allocated bandwidth for a given data stream does not fall below a predetermined threshold, such as to ensure that the quality of service does not degrade too far in view of the endpoint preferences that were received at 204. From 214 the method can return to 212 to determine once again whether the adjusted allocation is within an acceptable operating parameter. Once the operating parameters are determined to be acceptable, the method can proceed to 212 to implement the allocation of bandwidth for each of the endpoints in the multimedia conference.

FIG. 5 depicts an example of a method 300 that can be utilized at an endpoint for allocating bandwidth for different types of media being communicated. The method 300 begins at 302 in which the media session is set up. Once the media session is set up, a determination can be made as to whether user input for bandwidth preferences have been received (e.g., via GUI 130 of FIG. 3). If no user input is received, the method can loop at 304 and wait for receipt of a user input to set a bandwidth preference. If a user input is received at 304, the method can proceed to 306. At 306, the bandwidth preferences can be sent. As mentioned, the bandwidth preferences can be specified by one or more users at a given endpoint. While looping at 304 default user preferences that have been established by the system can be utilized. The default can be stored remotely or be provided automatically by each endpoint.

At 308, a determination regarding bandwidth allocation instructions can be made. The bandwidth allocation instructions can be received at the endpoint responsive to the preferences sent at 306. The bandwidth allocation instructions at 308 can be generated by a bandwidth manager, such as according to the method 200 of FIG. 4 or as otherwise disclosed herein. At 310, the endpoint can set its distribution of bandwidth for the different types of data communicated in the multimedia session according to the bandwidth allocation instructions received at 308.

From 310, the method can return to 308 in which further bandwidth allocation instructions can be received at the given endpoint. The further bandwidth allocation instructions can be based on an input received at 304 for the given endpoint implementing the method 300 or in the absence of such given endpoint providing further bandwidth allocation preferences. For instance, another endpoint in a multimedia conference can input bandwidth allocation preferences (e.g., initially or dynamically during the conference), which can result in the allocation instructions being adjusted accordingly (e.g., by the bandwidth manager 74 of FIG. 2). Thus, the user experience can change dynamically for each of the endpoints during a multimedia conference in response to the preferences of the participants. Alternatively, the distribution of bandwidth for data streams may remain as set initially and no change during the conference.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims.

Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, the term "including" means including but not limited to. The term "based on" means based at least in part on.

What is claimed is:

1. A method comprising:
   receiving, by a processor, endpoint preference data from each of a plurality of endpoints of a multimedia conference, wherein receiving the endpoint preference data comprises receiving, from each of the plurality of endpoints, media capabilities comprising a plurality of codecs for different media types and a bandwidth preference for the different media types;
   determining a bandwidth distribution of a total bandwidth allocated for the multimedia conference for the different media types, wherein determining the bandwidth distribution comprises determining a fraction for each of the media types based on the received endpoint preference data;
   allocating, by the processor, a fraction bandwidth from the total bandwidth to each of the different media types for each of the plurality of endpoints based on the determined fraction, wherein allocating the fraction bandwidth comprises:
      proportionally applying the bandwidth distribution to the total bandwidth for each of the plurality of endpoints to determine the fraction bandwidth, and selecting a first codec from the plurality of codecs to enable communication of the different types of media data commensurate with the allocated fraction bandwidth;

receiving a request, from a first endpoint, to alter a quality of a first media type being received by the first endpoint; and altering, in real-time, the fraction bandwidth allocated to the first media type for the first endpoint based on the received request, wherein altering the fraction bandwidth comprises selecting a second codec from the plurality of codecs to enable communication of the first media type commensurate with the requested quality of the first media type.

2. The method of claim 1, further comprising weighting, by the processor, the endpoint preference data such that a greater weight is afforded to the endpoint preference data from an endpoint having a greater relative importance than another endpoint determined to have a lesser relative importance, wherein the allocating is based on the weighting.

3. The method of claim 2, wherein the weighting is based on a relative ranking of each of the plurality of endpoints.

4. The method of claim 3, wherein the ranking is based on an identity of a user at each respective endpoint of the multimedia conference.

5. The method of claim 4, wherein the identity of the user is determined prior to the multimedia conference.

6. The method of claim 1, further comprising:
ranking, by the processor, each of the plurality of endpoints of the multimedia conference relative to each other;
assigning, by the processor, a weighting to the endpoint preference data from each endpoint based on the ranking; and
applying, by the processor, the assigned weighting to the endpoint preference data, such that the allocation of bandwidth between the different types for the multimedia conference accounts for the ranking.

7. The method of claim 1, further comprising:
receiving at a control unit the endpoint preference data from each of the plurality of endpoints of the multimedia conference in response to a user input at each respective endpoint; and
storing, by the processor, the endpoint preference data in memory of the control unit.

8. The method of claim 1, wherein determining the fraction comprises determining a percentage of the total available bandwidth that is applied to a total available bandwidth capacity of each respective endpoint of the plurality of endpoints in the multimedia conference.

9. The method of claim 8, wherein at least two endpoints of the multimedia conference have different total bandwidth capacities, the allocation of bandwidth being applied proportionately to the total bandwidth capacity of each of the at least two endpoints for the different media types.

10. The method of claim 1, further comprising dynamically adjusting, by the processor, the allocation of bandwidth during the multimedia conference in response to a change in the endpoint preference data for at least one of the plurality of endpoints.

11. The method of claim 1, further comprising allocating the total bandwidth for each of the plurality of endpoints based on the media capabilities of each of the plurality of endpoints negotiated during call signaling and based on the analysis of the endpoint preference data.

12. The method of claim 1, further comprising:
encoding, by the processor, a portion of the data of the multimedia conference for the given endpoint using a given encoding format; and
encoding, by the processor, a portion of the data of the multimedia conference for the other endpoint using another encoding format.

13. An apparatus comprising:
an analyzer configured to determine a distribution of a total bandwidth for different types of media employed in a multimedia conference, wherein the analyzer being configured to determine the distribution comprises the analyzer being configured to:
receive the user-programmable preference data from a plurality of endpoints of the multimedia conference, the user-programmable data comprising media capabilities comprising a plurality of codecs for different types of media and a bandwidth preference for the different types of media, and
determine a fraction of the total bandwidth for each of the different types of media based on the user-programmable preference data received from the plurality of endpoints of the multimedia conference; and
a bandwidth allocation engine configured to allocate a fraction bandwidth for each of the different types of media of the multimedia conference based on the determined fraction, wherein the bandwidth allocation engine is further configured to allocate the bandwidth for each of the different type of media for each of the plurality of the endpoints in the multimedia conference, based on the distribution of bandwidth and endpoint capabilities, wherein the bandwidth allocation being configured to allocate the fraction bandwidth comprises the bandwidth allocation being configured to:
proportionally apply the bandwidth distribution to the total bandwidth for each of the plurality of endpoints to determine the fraction bandwidth, and
select a first codec from the plurality of codecs to enable communication of the different types of media data commensurate with the allocated fraction bandwidth;
wherein a given endpoint is allocated a different amount of the total bandwidth for the multimedia conference than another endpoint and change the total bandwidth allocated to a given endpoint of the endpoints during the multimedia conference causes reallocation of the bandwidth, wherein the bandwidth allocation engine is further configured to:
receive a request, from a first endpoint, to alter a quality of a first type of media being received by the first endpoint; and
alter, in real-time, the fraction bandwidth allocated to the first type of media based on the received request, wherein the bandwidth allocation engine being configured to alter the fraction bandwidth comprises the bandwidth allocation engine being further configured to select a second codec from the plurality of codecs to enable communication of the first media type commensurate with the requested quality of the first type of media.

14. The apparatus of claim 13, wherein the analyzer is further configured to apply a weight to the user-programmable preference data depending on a relative ranking of each of the plurality of endpoints.

15. The apparatus of claim 14, wherein the relative ranking of each of the plurality of endpoints is based on an identity of a user associated with each respective endpoint of the multimedia conference.

16. The apparatus of claim 15, wherein the identity of the user is determined prior to the multimedia conference.

17. The apparatus of claim 13, wherein the analyzer and the bandwidth allocation engine comprise a control unit in a multi-point multimedia conferencing system, the user-programmable preference data being stored in a memory in response to a user input at each respective endpoint.

18. The apparatus of claim 17, wherein the bandwidth allocation engine is further configured to dynamically adjust the bandwidth allocation during the multimedia conference in response to a change of the user-programmable preference data for at least one of the plurality of endpoints.

19. The apparatus of claim 13, wherein the allocation of bandwidth for the different types of media comprises a percentage of the total available bandwidth that is applied proportionately to a total available bandwidth capacity for each respective endpoint of the plurality of endpoints in the multimedia conference.

20. A method comprising:
receiving, at a given endpoint of a multimedia conference, a plurality of codecs for different types of media and a user preference for distribution of a total bandwidth for the different types of media being communicated with the given endpoint of the multimedia conference;
sending, from the given endpoint to a control unit, the user preference; and
receiving, at the given endpoint bandwidth allocation instructions comprising instruction for a bandwidth distribution for each of the different types of media in the multimedia conference, the bandwidth distribution based upon a fraction of a total bandwidth assigned to the given endpoint for the multimedia conference, the fraction being determined for each of the different types of media based on an evaluation of user preferences for received from a plurality of endpoints in the multimedia conference, wherein receiving the endpoint bandwidth allocation comprises receiving the bandwidth allocation in response to:
proportionally applying the bandwidth distribution to the total bandwidth for each of the plurality of endpoints to determine the fraction bandwidth, and
selecting a first codec from the plurality of codecs to enable communication of the different types of media data commensurate with allocated fraction bandwidth;
receiving a request, from the given endpoint, to alter a quality of a first type of media being received by the given endpoint; and
altering, in real-time, a fraction bandwidth allocated to the first type of media based on the received request, wherein altering the fraction bandwidth comprises selecting a second codec from the plurality of codecs to enable communication of the first type of media commensurate with the requested quality of the first type of media.

21. The method of claim 20, wherein the distribution of bandwidth for the different types of media is set based on applying a weighting to the user preferences for the plurality of endpoints in the multimedia conference based on a relative ranking for the plurality of endpoints.

22. The method of claim 20, further comprising:
receiving, at the given endpoint during the multimedia conference, updated bandwidth allocation instructions; and
adjusting the distribution of bandwidth for each of the different types of media communicated from the given endpoint based on the updated bandwidth allocation instructions.

23. The method of claim 20, wherein receiving the user preference for distribution of bandwidth for the different types of media comprises receiving the user preference as a user input at the given endpoint.

24. The method of claim 23, wherein receiving the user input at the given endpoint comprises receiving the user input during the multimedia conference.

25. The method of claim 20, wherein sending the user preference to the control unit comprises sending the user preference to the control unit remotely located from the given endpoint, the control unit configured to evaluate the user preference.

26. The method of claim 20, further comprising receiving, at the given endpoint, updated bandwidth allocation instructions from the control unit during the multimedia conference, the updated bandwidth allocation instructions characterizing a change in bandwidth allocation at the given endpoint for the multimedia conference.

27. The method of claim 20, wherein the user preference corresponds to a quality of service corresponding to at least one of the different types of media.

28. An apparatus comprising:
a transmitter configured to send, from a given endpoint of a multimedia conference to a control unit a plurality of codecs for different types of media and a user preference for distribution of bandwidth for the different types of media being communicated with the given endpoint of the multimedia conference; and
endpoint controls communicating the different types of media in the multimedia conference with a bandwidth distribution for each of the different types of media, the bandwidth distribution determined according to bandwidth allocation instructions from the control unit, the bandwidth allocation instructions being based on an evaluation of user preferences for multiple endpoints in the multimedia conference to determine a fraction of a total bandwidth allocated to each of the multiple endpoints to be distributed to the different types of media, wherein the endpoint controls is configured to:
proportionally apply the bandwidth distribution to the total bandwidth for each of the plurality of endpoints to determine the fraction bandwidth, and
select a first codec from the plurality of codecs to enable communication of the different types of media data commensurate with the allocated fraction bandwidth;
receive a request, from the given endpoint, to alter a quality of a first types of data being received by the given endpoint; and
alter, in real-time, a fraction bandwidth allocated to the first type of media based on the received request, wherein the endpoint controls being configured to alter the fraction bandwidth comprises the endpoint controls further configured to select a second codec from the plurality of codecs to enable communication of the first type of media commensurate with the requested quality of the first type of media.

29. The apparatus of claim 28, wherein the distribution of bandwidth for the different types of media is set based on applying a weighting to the user preferences for each of the multiple endpoints in the multimedia conference based on a relative ranking for the each of the multiple endpoints.

30. The apparatus of claim 28, further comprising:
a receiver configured to receive updated bandwidth allocation instructions at the given endpoint during the multimedia conference, the endpoint distribution of bandwidth for each of the different types of media communicated from the given endpoint being dynamically adjusted during the multimedia conference based on the updated bandwidth allocation instructions.

31. The apparatus of claim 28, further comprising a user interface configured to set the user preference for distribution of bandwidth for the different types of media in response to a user input at the given endpoint.

* * * * *